(12) United States Patent
Tsunemiya et al.

(10) Patent No.: US 6,694,097 B2
(45) Date of Patent: Feb. 17, 2004

(54) DISTANCE MEASURING DEVICE, FOCUS DETECTOR, AND CAMERA INCLUDING PLURAL SENSORS AND CONTROLLER FOR SELECTIVELY PROVIDING POWER TO SENSORS AND RESPECTIVE PROCESSING CIRCUITS

(75) Inventors: Takanobu Tsunemiya, Kanagawa (JP); Koji Oshima, Kanagawa (JP); Takashi Ichimiya, Kanagawa (JP); Yasuhiro Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/339,285

(22) Filed: Jan. 10, 2003

(65) Prior Publication Data

US 2003/0142969 A1 Jul. 31, 2003

(30) Foreign Application Priority Data

Jan. 25, 2002 (JP) ........................................ 2002-017058

(51) Int. Cl.⁷ .............................................. G03B 13/36
(52) U.S. Cl. ........................ 396/80; 396/92; 396/106; 396/109; 396/123; 396/129
(58) Field of Search ........................... 396/129, 80, 92, 396/106, 109, 121–124

(56) References Cited

U.S. PATENT DOCUMENTS

| 5,051,767 | A |   | 9/1991 | Honma et al. ............... 354/406 |
| 5,805,939 | A | * | 9/1998 | Hamamura et al. ......... 396/123 |
| 5,937,217 | A |   | 8/1999 | Ohtsuka et al. ............. 396/310 |
| 6,357,935 | B1 |  | 3/2002 | Taka et al. .................. 396/349 |
| 6,381,413 | B1 | * | 4/2002 | Harada ........................ 396/80 |

FOREIGN PATENT DOCUMENTS

JP 62-180315 8/1987 ............ G02B/7/11

* cited by examiner

Primary Examiner—W. B. Perkey
(74) Attorney, Agent, or Firm—Fitzpatrick, Cella, Harper & Scinto

(57) ABSTRACT

A distance measuring device, or a focus detector, including a plurality of sensors provided in association with a plurality of different areas, and a respective plurality of processing circuits provided in association with the plurality of sensors, to process signals output from the plurality of sensors, where power selectively is supplied only to a sensor(s) and a processing circuit(s) associated with the sensor(s) that correspond to a predetermined area from among the plurality of different areas. The predetermined area may be determined on the basis of the state of a power source (e.g., detected voltage level), the focal length of a shooting optical system, the state of an auxiliary light for irradiating an object, and the like.

26 Claims, 6 Drawing Sheets

DISTANCE MEASURING DEVICE, FOCUS DETECTOR, AND CAMERA INCLUDING PLURAL SENSORS AND CONTROLLER FOR SELECTIVELY PROVIDING POWER TO SENSORS AND RESPECTIVE PROCESSING CIRCUITS

BACKGROUND OF THE INVENTION

1. Field of the Invention

The present invention relates to an improved multi-point distance measuring device capable of obtaining information on distance measurement in a plurality of areas.

2. Description of the Related Art

A passive distance measurement apparatus employs a method whereby reflected light from an object is divided in two so as to determine the distance from the object on the basis of the amount of a relative shift between the two optical images that are respectively formed thereby. This type of conventional distance measuring device has found extensive use in cameras and the like.

For instance, Japanese Examined Patent Publication No. 6-100717 discloses a construction in which distance measurement is performed at a plurality of points in carrying out passive distance measurement. If the measurement result indicates that an object has a low illuminance level and low contrast, then auxiliary light is irradiated onto the object and the distance measurement is performed only in a particular area.

It is generally accepted that the passive distance measurement method is not good at performing distance measurement on an object with a low illuminance and low contrast. In order to obtain reliable distance measurement information from an object with a low illuminance and low contrast, auxiliary light is irradiated onto the object to acquire the distance information at least on a particular point.

In addition to a through-the-lens (TTL) type distance measuring device, there is an external measurement type distance measuring device. U.S. Pat. No. 5,051,767 discloses an external measurement type distance measuring device that changes the operating range of a line sensor on the basis of the focal length of a shooting optical system. For instance, in an external measurement type device in which the focal length of the shooting optical system can be changed, while the distance measurement area cannot be changed, the distance measurement area moves toward the outside of a shooting image view angle range as the focal length increases. Hence, when the focal length exceeds a certain value, the distance measurement area will be outside a shooting image view angle, which is the image view angle range that permits shooting.

For this reason, a device has been provided that carries out a control operation that prevents distance measurement from being performed outside a shooting image view angle range.

SUMMARY OF THE INVENTION

In one aspect, the present invention relates to a distance measuring device, or a focus detector, having sensors for a plurality of areas and respective processing circuits for the sensors, wherein power is supplied only to a sensor and a processing circuit associated with a predetermined area.

In another aspect, the present invention relates to a distance measuring device, or a focus detector, having sensors for a plurality of areas and processing circuits for the sensors, wherein the sensors and the processing circuits to which power is to be simultaneously supplied are selected according to the condition of a power source that supplies power to the sensors and the processing circuits.

In still another aspect, the present invention relates to a distance measuring device, or a focus detector, having sensors for a plurality of areas and processing circuits for the sensors, wherein the sensors and the processing circuits to which power is to be supplied are selected according to the focal length of a shooting optical system.

In a further aspect, the present invention relates to a distance measuring device, or a focus detector, having sensors for a plurality of areas and processing circuits for the sensors, wherein the sensors and the processing circuits to which power is to be supplied are selected according to the area to which auxiliary light is projected.

In yet another aspect, the present invention relates to a camera having a distance measuring device, or focus detector, as described above.

Further objects, features and advantages of the present invention will become apparent from the following description of the preferred embodiments with reference to the attached drawings.

DESCRIPTION OF THE PREFERRED EMBODIMENTS

The present invention will be explained in detail in conjunction with the preferred embodiments shown in the accompanying drawings.

Figure 1A:
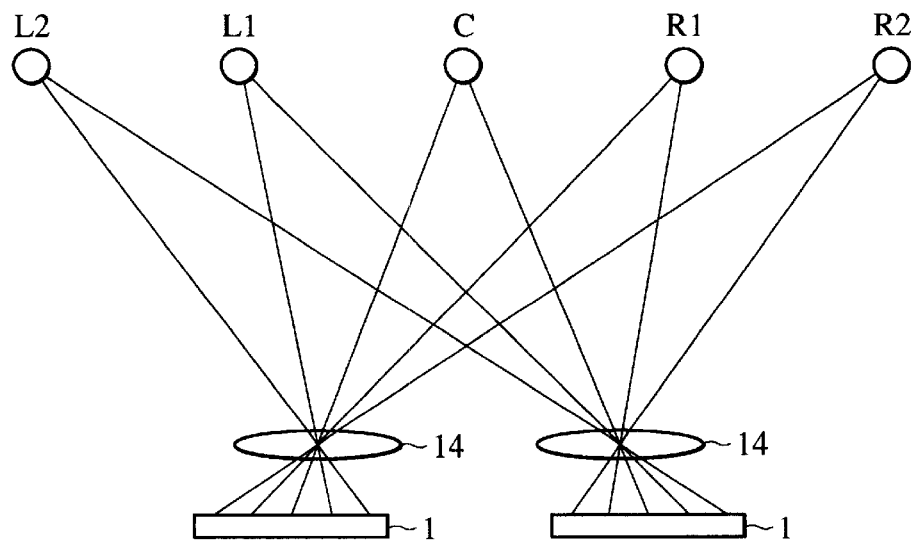
FIG. 1A is a block diagram showing the construction of a major section of a distance measuring device according to an embodiment of the present invention.
Figure 1B:
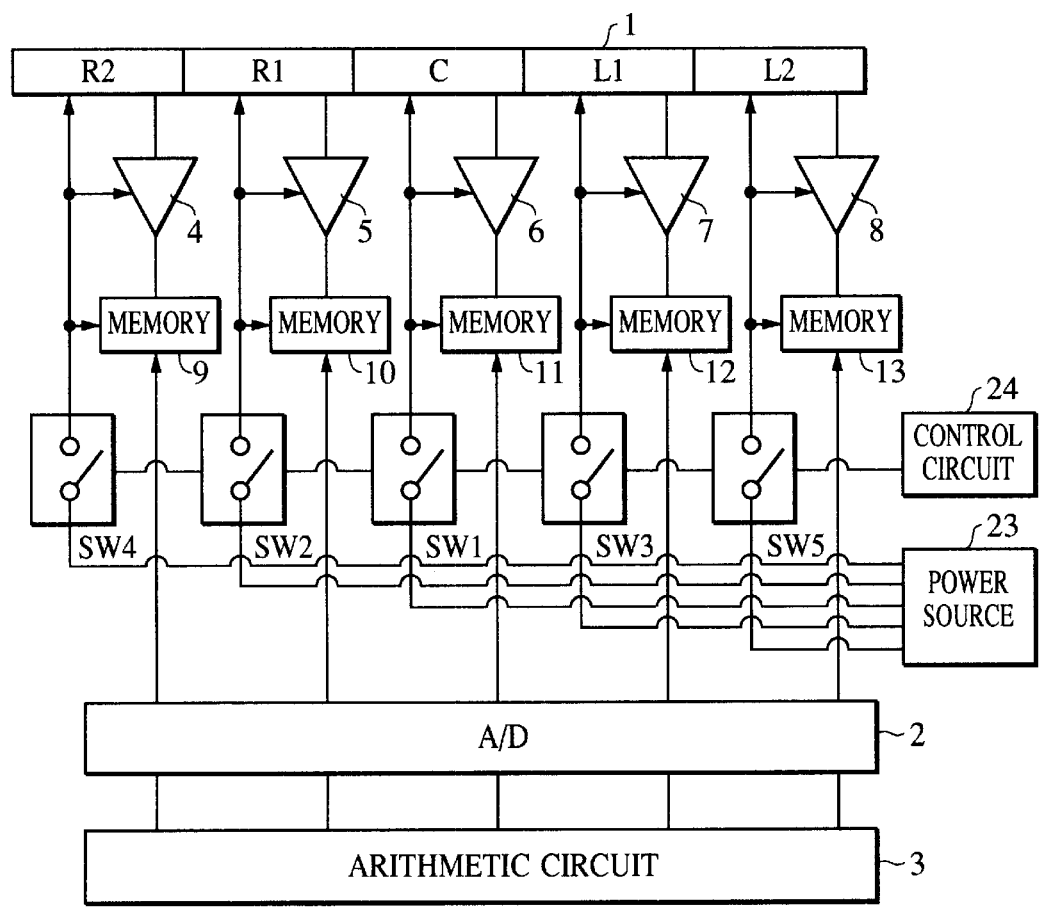
FIG. 1B is a schematic view of a sensor arrangement of FIG. 1A.

FIG. 1A is a block diagram showing a schematic construction of an external measurement type distance measuring device according to one embodiment of the present invention, and FIG. 1B is a schematic view of a sensor arrangement of FIG. 1A. FIG. 1A illustrates the schematic construction of a passive multi-point distance measurement and optical paths, while FIG. 1B is an enlarged view of a sensor arrangement, showing the configurations of associated signal processing circuits.

Referring to FIGS. 1A and 1B, the image of an object is formed on each of two line sensors 1, which produce respective signals for calculating the distance to the object. Each line sensor 1 is divided into five areas (R2, R1, C, L1, and L2; "R"=right, "C"=center, and "L"=left) so as to constitute five sensors. Alternatively, five independent sensors may be used in place of each line sensor.

These five sensors are independently controlled so as to perform distance measurement using acquired signals. An A/D converter 2 digitizes accumulated signal amounts to convert them into data that can be used for computation. An arithmetic circuit 3 compares the signals received from the sensors R2, R1, C, L1 and L2 with the data processed by the A/D converter 2, and converts the comparison results into distance information. Amplifiers 4 through 8 are independently provided for the sensors to amplify respective signals output from the sensors. Memories 9 through 13 store the signals of the sensors. The stored signals are subjected to A/D conversion to obtain distance information. Hereinafter, each amplifier and associated memory together will be referred to as a processing circuit. Each light receiving lens 14 causes the image of an object to be formed on a respective line sensor. Switches SW1 through SW5 are connected to a power source 23 provided with a circuit for detecting the voltage of the power source. A control circuit 24 controls, for each area, respective switches SW1 through SW5 so as to selectively supply and interrupt the supply of power from the power source to the sensors and the processing circuits associated with the sensors.

Figure 2:
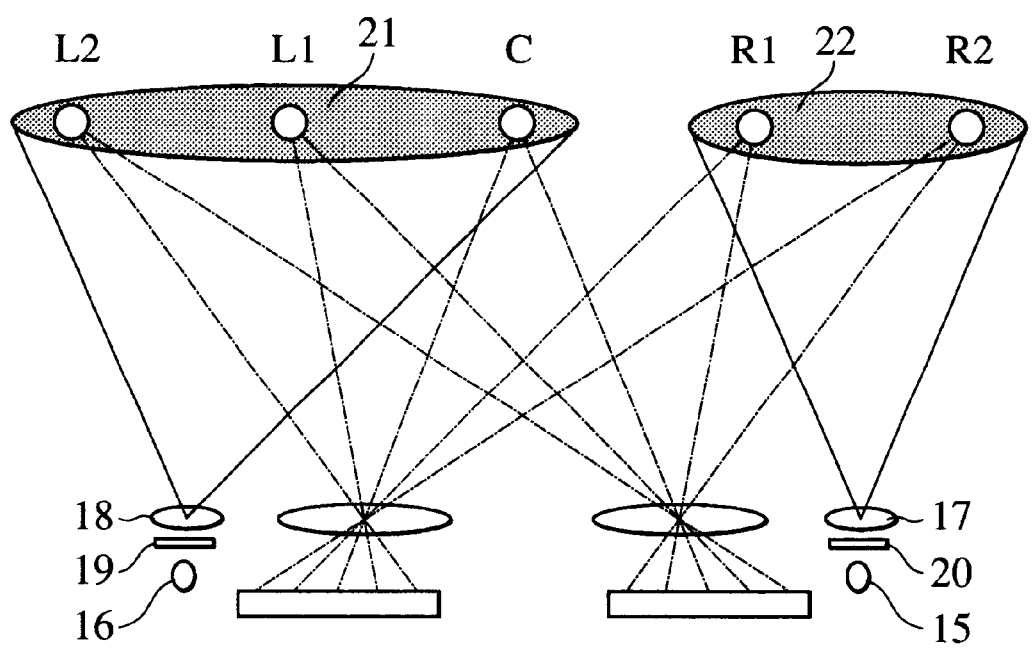
FIG. 2 is a diagram for explaining the positions where auxiliary light is applied in the distance measuring device shown in FIGS. 1A and 1B.

FIG. 2 shows the lighting system for applying auxiliary light, which is provided so as to prevent passive distance measurement from becoming impossible due to low illuminance and low contrast, and the areas to which the light is applied.

Referring to FIG. 2, light sources 15 and 16, which provide auxiliary light, may be lamps or LEDs. Projecting lenses 17 and 18 condense light from the light sources 15, 16 onto an object and effectively collect (focus) the light amount onto the object. Reference numerals 19 and 20 are slit plates. Light projected from the two light sources is converted into respective slit-like light beams through the slit plates 19 and 20 and projected onto the object. This makes it possible to measure the distance by determining the contrast of the slit-like light beams projected onto the object even if the contrast of the object itself is low.

Figure 3:
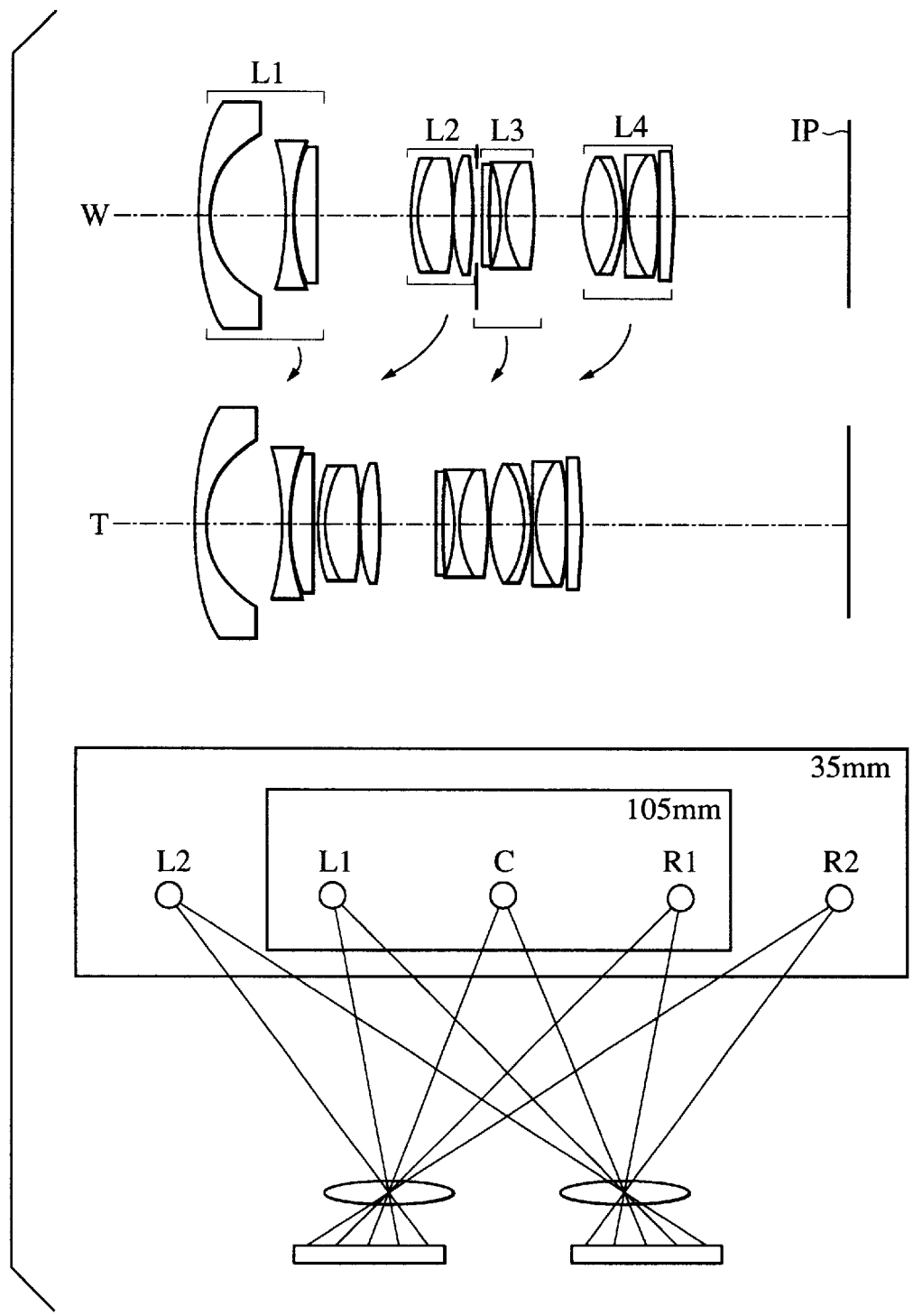
FIG. 3 is a diagram illustrating a relationship between distance measurement areas and focal lengths in the distance measuring device shown in FIGS. 1A and 1B.

FIG. 3 shows the relationship between the focal length of a shooting lens assembly and the light receiving angle of the distance measuring device. This illustrates the difference between a shooting image view angle and a light receiving angle (hereinafter referred to as "distance measurement angle") of the distance measuring device, the difference being produced in the case of the external measurement type. Such difference does not occur in a TTL type system.

The shooting lens is formed of, for example, a first lens group L1, a second lens group L2, a third lens group L3 and a fourth lens group L4. The focal length increases as the lens groups L1 to L4 are moved from W (wide-angle) to T (telephoto) in FIG. 3. Reference character IP denotes an image plane. The shooting image view angle range widens or narrows as the focal distance is changed, while the distance measurement angle in the external measurement type remains unchanged even when the focal length is changed. Therefore, changing the focal length causes a deviation to occur in the position and magnitude of a distance measurement angle with respect to a shooting image view angle. To minimize misalignment between a shooting image view angle and a distance measurement area, it is necessary to select a proper sensor of the distance measuring device according to the focal length, and to switch the distance measurement angle accordingly.

Figure 4:
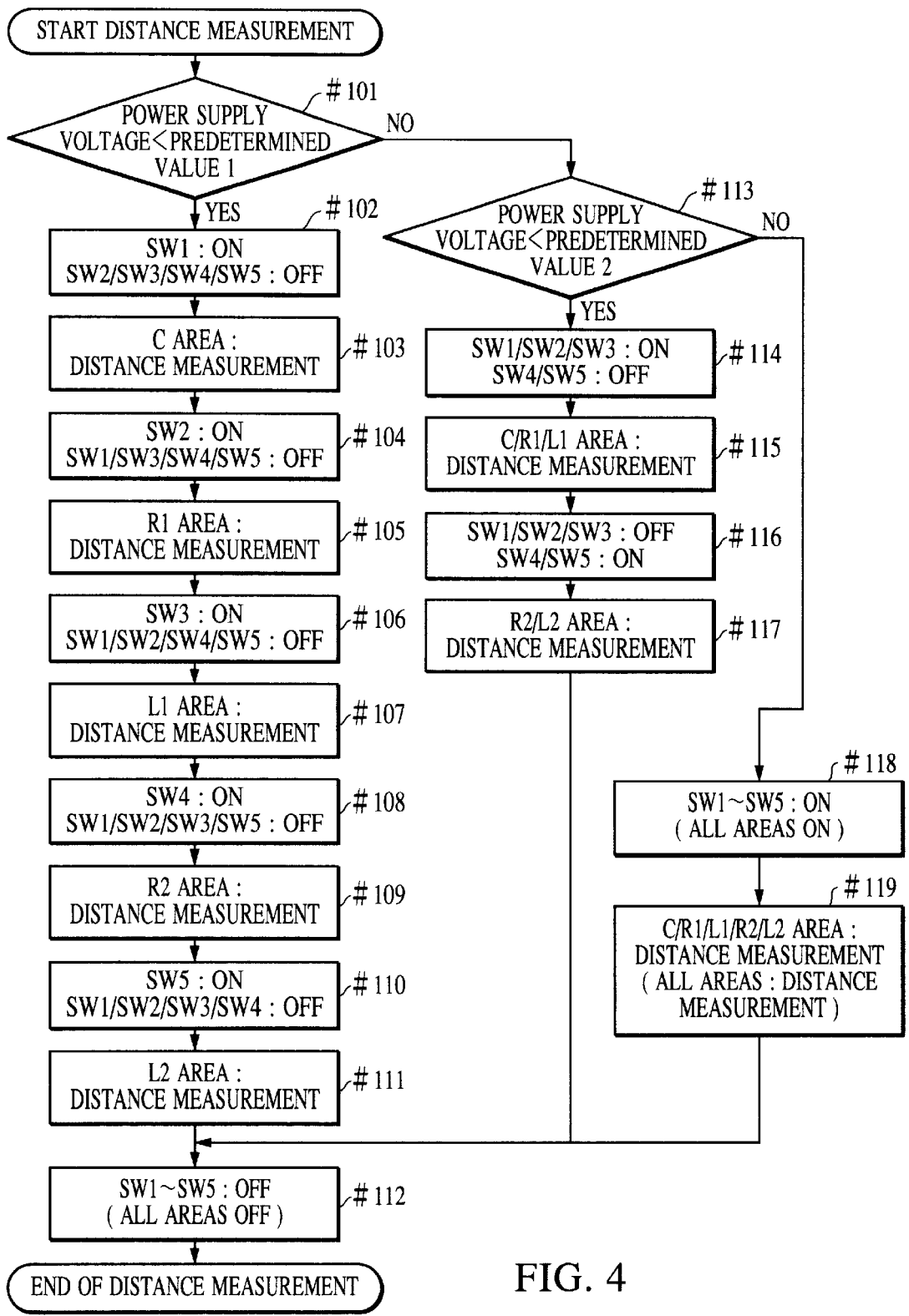
FIG. 4 is a flowchart showing operation of a major section according to a first embodiment of the present invention.

Referring now to the flowchart shown in FIG. 4, the distance measuring operation of the distance measuring device, which has the construction described above, in accordance with a first embodiment of the present invention, will now be described. A 35-mm focal length, as shown in FIG. 3, will be used to carry out the procedure illustrated by the flowchart in FIG. 4. Referring to FIGS. 1A, 1B, 2 and FIG. 3, sensors L2, L1, C, R1 and R2 correspond to object images L2, L1, C, R1 and R2 used for distance measurement.

First, in step #101, the state of the power source is detected before starting the distance measurement operation. It is desirable to check the state of the power source so as to select a method for supplying power so as to allow the distance measurement operation to be performed at a lowest possible voltage. To perform the distance measurement operation at a low voltage, the supply and interruption of supply of power to the sensors R2, R1, C, L1 and L2 may be separately controlled. It would not be advantageous, however, to control the supply of power to the sensors in this manner in every case, because simultaneously supplying power to a plurality of sensors enables the power to be simultaneously stored in the plurality of sensors, leading to a shortened distance measurement time.

Hence, on the basis of a detected power source voltage, the mode of ON/OFF switching of power to the sensors is selected from among (1) a mode in which ON/OFF switching of power is individually switched for each sensor, (2) a mode in which the ON/OFF switching of power for a selected plurality of sensors is simultaneously switched, and (3) a mode in which the ON/OFF switching of power for all sensors is simultaneously switched.

If it is determined in step #101 that the value of the power source voltage is less than a predetermined value 1, then the process proceeds to step #102, to control the supply and interruption of supply of power for each sensor individually, so as to minimize the drop in the power source voltage. More specifically, only switch SW1 is turned ON, thereby to supply power to the central sensor C and the processing circuit associated with sensor C. In the next step #103, a distance measurement operation for area C is performed. In this case, since power is supplied to only one sensor from among the plurality of sensors, this is the mode consuming the least power. In subsequent step #104, only switch SW2 is turned ON, thereby to supply power only to sensor R1 for capturing an object image R1, positioned in the right area within the shooting image view angle range, and the processing circuit associated with sensor R1; a distance measurement operation for the R1 area then is performed in subsequent step #105.

In the next step #106, only switch SW3 is turned ON, thereby to supply power only to sensor L1, for capturing an object image L1 positioned in the left area, and the processing circuit associated with sensor L1, so as to actuate them; a distance measurement operation for the L1 area then is performed in subsequent step #107. In the next step #108, only switch SW4 is turned ON, thereby to supply power only to sensor R2, for capturing an object image R2 positioned in the furthest right area, and the processing circuit associated with sensor R2, so as to actuate them; a distance measurement operation for the R2 area then is performed in subsequent step #109. In the subsequent step #110, only switch SW5 is turned ON, thereby to supply power only to the sensor L2, for capturing an object image L2 positioned in the furthest left area, and the processing circuit associated with sensor L2, so as to actuate them; a distance measurement operation for the L2 area then is performed in step #111.

Thus, if the power source voltage is less than predetermined value 1, then the supply of power to the sensor associated with a certain area, and the processing circuit associated with that sensor, is selectively turned ON or OFF. This operation is sequentially repeated for each of the sensors associated with other areas, and the respective processing circuits, so as to acquire the distance measurement data for all areas.

In the last step #112, the supply of power to all sensors is interrupted (switched OFF), so as to complete the distance measurement operation.

If it is determined in the above step #101 that the power source voltage is not less than the predetermined value 1, then the process proceeds to step #113, where the power source voltage is determined again. In step #113, the power source voltage is determined by comparison with a predetermined value 2, which is higher than the foregoing predetermined value 1. If the determination result indicates that the power source voltage is less than predetermined value 2, then the process proceeds to step #114, and power is simultaneously supplied to a selected plurality of sensors and the processing circuits associated therewith, so as to actuate them, since no problem arises even when power is supplied to the plurality of sensors and their associated processing circuits, because the power source voltage is not less than the predetermined value 1. In this step #114, switches SW1, SW2 and SW3 are turned ON, thereby to supply power to the three sensors C, R1 and L1 and their associated processing circuits; distance measurement data on the individual C/R1/L1 areas then is acquired in step #115. In the next step #116, switches SW4 and SW5 are turned ON, so as to supply power to the remaining two sensors R2 and L2 and their associated processing circuits: distance measurement data on these R2/L2 areas then is acquired in step #117.

As described above, when the power source voltage lies between the predetermined value 1 and the predetermined value 2, the sensors L2, L1, C, R1 and R2 are divided into two groups, and power is simultaneously supplied to each sensor and the associated processing circuit for each group so as to obtain distance measurement data for all areas.

In step #112, the supply of power to all sensors is interrupted so as to complete the distance measurement operation. With this arrangement, the number of switching operations (that is, turning ON/OFF of the power) is reduced by three, as compared with the case where the power source voltage is low (less than the predetermined value 1). This makes it possible to shorten the time required for measuring a distance to the object.

If it is determined that the power source voltage is not less the predetermined value 2 in the foregoing step #113, then it is not necessary to selectively supply power by shifting the ON/OFF switch timing for each sensor. Hence, the process proceeds to step #118, to turn ON all switches SW1 through SW5, thereby to supply power to all sensors and processing circuits so as to simultaneously actuate them. In the following step #119, distance measurement data on all areas C/R1/L1/R2/L2 is acquired. Finally, in step #112, the supply of power to all sensors is switched OFF so as to complete the distance measurement operation.

The series of operations described above is illustrated by the flowchart applied to a case where the focal length is 35 mm. If the focal length is 105 mm, then the sensors R2 and L2 located at the outermost positions would be outside the shooting image view angle range, so that the stored signals from the sensors R2 and L2 are not used for distance measurement. For this reason, the affected steps may be deleted from the flowchart of FIG. 4.

More specifically, steps #108 through #111 may be deleted, steps #116 and #117 may be deleted, only the SW1, SW2 and SW3 may be turned ON in step #118, and the distance measurement operation may be performed using only the signals of sensors R1, C and L1 in step #119. Thus, if the power source voltage is not less than the predetermined value 1, then the supply of power to the three sensors C, R1, L1 used for distance measurement may be simultaneously turned ON.

As described above, according to the first embodiment, a power control function is provided that permits power to be independently supplied to each area for each sensor and its associated processing circuit. With this arrangement, by selectively switching the simultaneously supplied voltage in accordance with the state of a power source voltage, the distance measurement operation can be performed even when the voltage level declines. In addition, the use of a device that detects the voltage level in advance makes it possible to not only reduce the voltage level required to assure that a proper distance measurement operation can be carried out, but also permits the time required for a distance measurement operation to be shortened.

Figure 5:
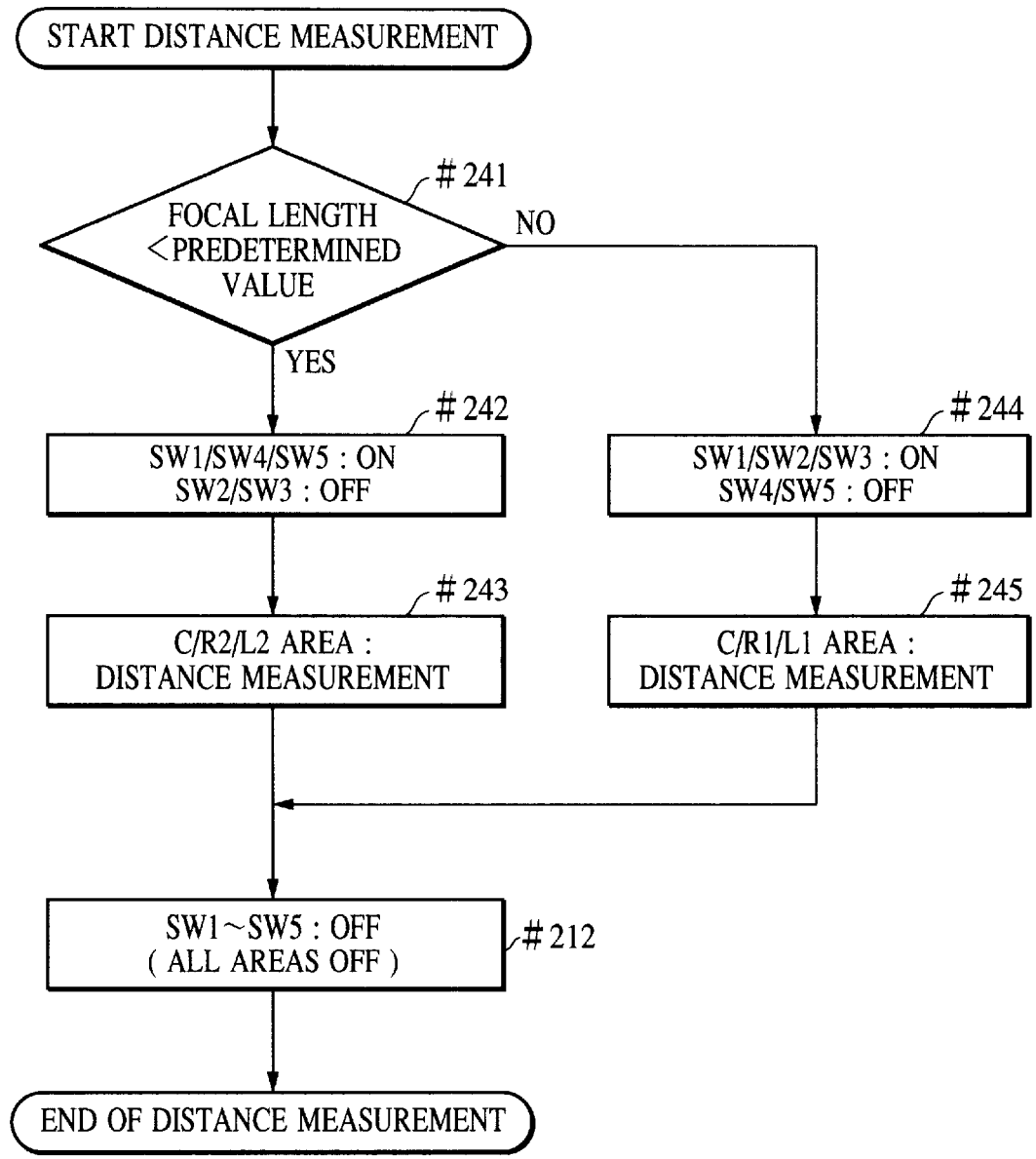
FIG. 5 is a flowchart showing operation of a major section according to a second embodiment of the present invention.

Referring now to the flowchart shown in FIG. 5, a description will be given of the distance measurement operation of a distance measuring device according to a second embodiment of the present invention, where the distance measuring device also has a construction as shown in FIGS. 1A 1B, 2 and 3.

In step #241, the focal length of a shooting lens is detected. Unlike the TTL type application, the shooting image view angles and the distance measurement angles do not completely agree in the case of an external measurement type application, as mentioned above. For this reason, a distance measurement area may extend beyond the shooting image view angle range when the focal length of the shooting lens changes.

Therefore, it is necessary to narrow the distance measurement angle range when it is determined that the shooting image view angle is small, which means that the focal length is large. Hence, in step #241, a determination is performed to minimize the disagreement between the distance measurement angle and the shooting image view angle. If it is determined that the detected focal length is less than a predetermined value (e.g., the focal length is 35 mm), then the process proceeds to step #242.

In step #242, switches SW1, SW4 and SW5 are turned ON, and power is supplied to sensors C, R2 and L2 and their associated processing circuits. This provides a distance measurement angle suited for shooting at a wide shooting image view angle. At this time, switches SW2 and SW3 are turned OFF so as not to supply power to the sensors R1 and L1, and their associated processing circuits. Then, the process proceeds to step #243 to acquire distance measurement data for each area C/R2/L2. Upon completion of the distance measurement, the process proceeds to step #212 to switch OFF the supply of power, thus finishing the distance measurement operation.

On the other hand, if it is determined in step #241 that the focal length is not less than the predetermined value (e.g., the focal length is 105 mm), then the process proceeds to step #244, thereby to turn ON switches SW1, SW2 and SW3, so as to supply power to the sensors C, R1 and L1, and their associated processing circuits. This provides a distance measurement angle suited for shooting at a narrow shooting image view angle. At this time, switches SW4 and SW5 are turned OFF so as not to supply power to sensors R2 and L2, and their associated processing circuits. In the following step #245, distance measurement data for each area C/R1/L1 is acquired. Upon completion of the distance measurement, the supply of power to all sensors is switched OFF in step #212, thus finishing the distance measurement operation.

As explained above, according to the second embodiment, a power control function is provided that permits power to be independently supplied to each area for each sensor and its associated processing circuit. Depending on the focal length of a shooting lens, the distance measurement angle is automatically changed, and the destination of power supply is changed. This arrangement makes it possible to avoid wasteful power consumption and also to achieve a shortened distance measurement time.

Figure 6:
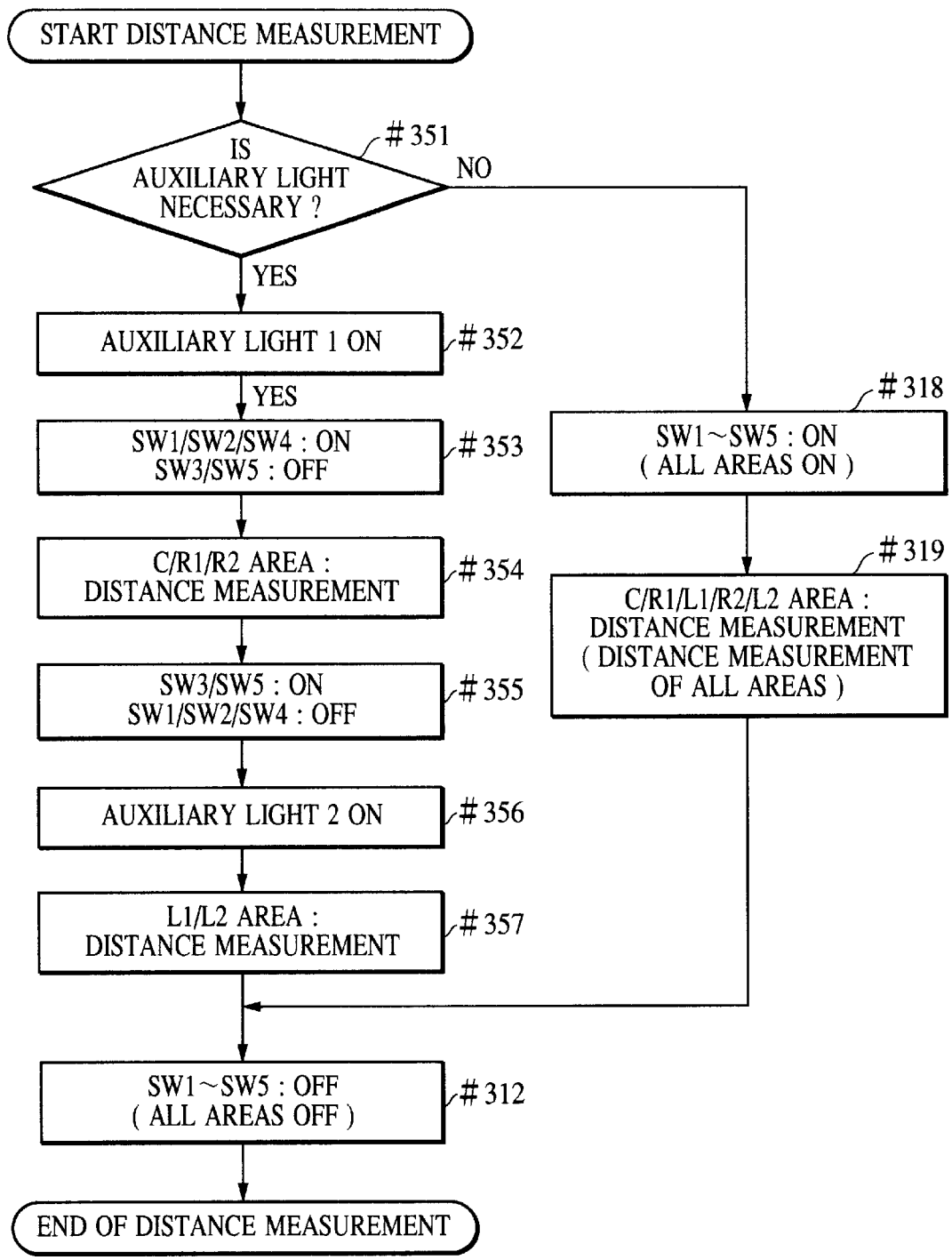
FIG. 6 is a flowchart showing operation of a major section according to a third embodiment of the present invention.

Referring to the flowchart shown in FIG. 6, the distance measurement operation of a distance measuring device according to a third embodiment of the present invention that has the construction shown in FIGS. 1A and 1B or FIG. 2 will now be described.

Before starting the description in conjunction with the flowchart shown in FIG. 6, the condition prior to operation briefly will be described.

According to the passive distance measurement method, reflective light from an object is divided into two, and the distance to the object is determined on the basis of the amount of a relative shift between two optical images that are respectively formed thereby. If an object has a low contrast or low illuminance, such distance measurement may not be possible. In such a case, a method is generally known in which light referred to as auxiliary light is applied to the object to make it possible to perform the distance measurement operation. In conjunction with a third embodiment according to the present invention, description will now be given of a distance measurement operation in which it is determined whether auxiliary light is required.

First, in step #351, it is determined whether the auxiliary light must be turned ON. The auxiliary light is turned ON under a condition where the contrast of an object is too low to carry out a distance measurement operation. If it is determined that the auxiliary light needs to be turned ON, then the procedure proceeds to step #352, thereby to first turn ON an auxiliary light 1, which corresponds to the light source 16 in FIG. 2. This causes the auxiliary light 1 to be applied to a distance measurement area wherein the object image receiving the light by the sensors C, L1 and L2 of the line sensor 1 exists, as shown in FIG. 2. Then, the procedure proceeds to step #353 to supply power primarily to the sensors in the area to which the auxiliary light 1 is being applied. In this case, the switches SW1, SW3 and SW5 are turned ON to supply power to the sensors C, L1 and L2 and their associated processing circuits. This permits distance measurement using the sensors associated with the area to which the auxiliary light is being applied. At this time, the switches SW2 and SW4 are turned OFF so as not to supply power to the sensors R1 and R2, and their associated processing circuits. In the next step #354, the distance measurement data on these areas is acquired.

Subsequently, the process proceeds to step #355 to perform distance measurement in the remaining distance measurement area of the shooting image view angle, and turns the switches SW2 and SW4 ON, thereby to supply power to the sensors R1 and R2 and their associated processing circuits. At this time, the switches SW1, SW3, and SW5 are turned OFF so as not to supply power to the sensors C, L1 and L2 and their associated processing circuits. An auxiliary light 2 (corresponding to the light source 15 shown in FIG. 2) for the remaining distance measurement area is turned ON in step #356. In the following step #357, the distance measurement data on the remaining area is obtained. Upon completion of distance measurement, the process proceeds to step #312 to cut off the supply of power to all sensors, thus finishing the distance measurement operation.

If it is determined in step #351 that no auxiliary light is necessary, then the process proceeds to step #318 to supply power to all of the sensors and processing circuits. In the next step #319, the distance measurement operation is carried out on all distance measurement areas. Upon completion of the distance measurement, the process proceeds to step #312 to cut off the supply of power to all the sensors, thus finishing the distance measurement operation.

Thus, the third embodiment is provided with a device for supplying power only to the sensors and the processing circuits that are associated with the areas to which the auxiliary light is applied. The range in which power is supplied to the sensors is automatically switched, depending on the state of auxiliary lights, that is, which of the lights is ON. This arrangement permits the distance measurement operation to be continued at a lowest possible voltage even when auxiliary lights consuming large energy are used.

These skilled in the art readily will recognize that it is possible to combine the information regarding the auxiliary lights, the power source voltage in the first embodiment, and the focal length of the shooting lens in the second embodiment.

The preferred embodiments described above can be applied to a distance measuring device adapted to divide the reflective light from an object in two so as to determine the distance to the object on the basis of the amount of the relative shift between optical images formed thereby. These embodiments also can be applied to a focus detector for detecting the focus state of an object on the basis of the contrast of the reflective light from the object. Such a focus detector may have the same circuit configuration as that shown in FIG. 1 except for the type of information obtained by the arithmetic circuit shown in FIG. 1.

The processing circuits are not limited to those constituted by the amplifiers and memories described above. Various other processing circuits may be used as long as they are capable of processing signals obtained by sensors.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A distance measuring device comprising:

a plurality of sensors provided in association with a plurality of different areas;

a plurality of processing circuits respectively provided in association with said plurality of sensors, to process signals output from said plurality of sensors; and a controller that supplies power to said plurality of sensors and said plurality of processing circuits, to actuate said plurality of sensors and said plurality of processing circuits, wherein, to obtain distance information in a predetermined area from among the plurality of different areas, said controller selectively supplies power only to a sensor that corresponds to the predetermined area and a processing circuit associated with said sensor.

2. The distance measuring device according to claim 1, wherein said controller selectively supplies power only to a first sensor that corresponds to a first predetermined area from among the plurality of different areas, and a first processing circuit associated with said first sensor, then interrupts the supply of power to said first sensor and said first processing circuit when an image signal of the first predetermined area is obtained, and thereafter selectively supplies power to a second senor that corresponds to a second predetermined area of the plurality of different areas and a second processing circuit associated with said second sensor.

3. A distance measuring device comprising:
   a plurality of sensors provided in association with a plurality of different areas;
   a plurality of processing circuits respectively provided in association with said plurality of sensors, to process signals output from said plurality of sensors;
   a power source that stores power for actuating said plurality of sensors and said plurality of processing circuits; and
   a controller that selectively supplies power from said power source to said plurality of sensors and said plurality of processing circuits,
   wherein said controller selects a first group of sensors from said plurality of sensors, and a respective first group of processing circuits from said plurality of processing circuits associated with said first group of sensors, on the basis of a voltage value of the power source, and simultaneously supplies power to the selected first group of sensors and associated first group of processing circuits.

4. The distance measuring device according to claim 3, wherein, as the voltage of said power source increases, said controller increases the number of sensors selected in the first group of sensors, and the respective first group of processing circuits associated with the first group of sensors, to which power is simultaneously supplied.

5. The distance measuring device according to claim 3, wherein said controller divides said plurality of sensors and said plurality of processing circuits into a plurality of groups and, if the voltage value of said power source is less than a predetermined value, selectively supplies power to each of the plurality of groups in sequence.

6. The distance measuring device according to claim 3, wherein, if the voltage value of the power source is greater than or equal to a predetermined value, said controller simultaneously supplies power to all sensors and processing circuits, and, if the voltage value of said power source is less than the predetermined value, said controller divides said plurality of sensors and said plurality of processing circuits into a plurality of groups and supplies power to each of the plurality of groups in sequence.

7. A distance measuring device for measuring a distance to an object comprising:
   a plurality of sensors provided in association with a plurality of different areas of an imaging surface;
   a plurality of processing circuits respectively provided in association with said plurality of sensors, to process signals output from said plurality of sensors; and
   a controller that supplies power to said plurality of sensors and said plurality of processing circuits, to actuate said plurality of sensors and said plurality of processing circuits,
   wherein said controller selectively supplies power only to predetermined sensors, and respective predetermined processing circuits associated with said predetermined sensors, on the basis of the focal length of an optical system that directs reflective light from an object to the imaging surface.

8. The distance measuring device according to claim 7, wherein the angle of view of the imaging surface changes with the focal length of the optical system, and said controller selectively supplies power only to sensors that correspond to an area existing in a position within the angle of view, and processing circuits associated with said sensors.

9. A distance measuring device for use with an auxiliary light, comprising:
   a plurality of sensors provided in association with a plurality of different areas;
   a plurality of processing circuits respectively provided in association with said plurality of sensors, to process signals output from said plurality of sensors; and
   a controller that supplies power to said plurality of sensors and said plurality of processing circuits, to actuate said plurality of sensors and said plurality of processing circuits,
   wherein said controller selectively supplies power only to sensors that correspond to an area where an auxiliary light is ON to aid a distance measurement operation, and processing circuits associated with said sensors.

10. A camera comprising:
    a camera body; and
    a distance measuring device comprising:
      a plurality of sensors provided in association with a plurality of different areas;
      a plurality of processing circuits respectively provided in association with said plurality of sensors, to process signals output from said plurality of sensors; and
      a controller that supplies power to said plurality of sensors and said plurality of processing circuits, to actuate said plurality of sensors and said plurality of processing circuits,
      wherein, to obtain distance information in a predetermined area from among the plurality of different areas, said controller selectively supplies power only to a sensor that corresponds to the predetermined area and a processing circuit associated with said sensor.

11. A camera comprising:
    a camera body; and
    a distance measuring device comprising:
      a plurality of sensors provided in association with a plurality of different areas;
      a plurality of processing circuits respectively provided in association with said plurality of sensors, to process signals output from said plurality of sensors;
      a power source that stores power for actuating said plurality of sensors and said plurality of processing circuits; and
      a controller that selectively supplies power from said power source to said plurality of sensors and said plurality of processing circuits,
      wherein said controller selects a first group of sensors from said plurality of sensors, and a respective first group of processing circuits from said plurality of processing circuits associated with said first group of sensors, on the basis of a voltage value of the power source, and simultaneously supplies power to the selected first group of sensors and associated first group of processing circuits.

12. A camera comprising:
a camera body; and
a distance measuring device for measuring a distance to an object, comprising:
   a plurality of sensors provided in association with a plurality of different areas of an imaging surface;
   a plurality of processing circuits respectively provided in association with said plurality of sensors, to process signals output from said plurality of sensors; and
   a controller that supplies power to said plurality of sensors and said plurality of processing circuits, to actuate said plurality of sensors and said plurality of processing circuits,
   wherein said controller selectively supplies power only to predetermined sensors, and respective predetermined processing circuits associated with said predetermined sensors, on the basis of the focal length of an optical system that directs reflective light from the object to the imaging surface.

13. A camera comprising:
a camera body; and
a distance measuring device for use with an auxiliary light, comprising:
   a plurality of sensors provided in association with a plurality of different areas;
   a plurality of processing circuits respectively provided in association with said plurality of sensors, to process signals output from said plurality of sensors; and
   a controller that supplies power to said plurality of sensors and said plurality of processing circuits, to actuate said plurality of sensors and said plurality of processing circuits,
   wherein said controller selectively supplies power only to sensors that correspond to an area where an auxiliary light is ON to aid a distance measurement operation, and processing circuits associated with said sensors.

14. A focus detector comprising:
a plurality of sensors provided in association with a plurality of different areas;
a plurality of processing circuits respectively provided in association with said plurality of sensors, to process signals output from said plurality of sensors; and
a controller that supplies power to said plurality of sensors and said plurality of processing circuits, to actuate said plurality of sensors and said plurality of processing circuits,
wherein, to obtain focus information in a predetermined area from among the plurality of different areas, said controller selectively supplies power only to a sensor that corresponds to the predetermined area, and a processing circuit associated with said sensor.

15. The focus detector according to claim 14, wherein said controller selectively supplies power only to a first sensor that corresponds to a first predetermined area from among the plurality of different areas, and a first processing circuit associated with said first sensor, then interrupts the supply of power to said first sensor and said first processing circuit when an image signal of the first predetermined area is obtained, and thereafter selectively supplies power to a second sensor that corresponds to a second predetermined area of the plurality of different areas and a second processing circuit associated with said second sensor.

16. A focus detector comprising:
a plurality of sensors provided in association with a plurality of different areas;
a plurality of processing circuits respectively provided in association with said plurality of sensors, to process signals output from said plurality of sensors;
a power source that stores power for actuating said plurality of sensors and said plurality of processing circuits; and
a controller that selectively supplies power from said power source to said plurality of sensors and said plurality of the processing circuits,
wherein said controller selects a first group of sensors from said plurality of sensors, and a respective first group of processing circuits from said plurality of processing circuits associated with said first group of sensors, on the basis of a voltage value of the power source, and simultaneously supplies power to the selected first group of sensors and associated first group of processing circuits.

17. The focus detector according to claim 16, wherein, as the voltage of said power source increases, said controller increases the number of sensors selected in the first group of sensors, and the respective first group of processing circuits associated with the first group of sensors, to which power is simultaneously supplied.

18. The focus detector according to claim 16, wherein said controller divides said plurality of sensors and said plurality of processing circuits into a plurality of groups and, if the voltage value of said power source is less than a predetermined value, selectively supplies power to each of the plurality of groups in sequence.

19. The focus detector according to claim 16, wherein, if the voltage value of the power source is greater than or equal to a predetermined value, said controller simultaneously supplies power to all sensors and processing circuits, and, if the voltage value of said power source is less than the predetermined value, said controller divides said plurality of sensors and said plurality of processing circuits into a plurality of groups and supplies power to each of the plurality of groups in sequence.

20. A focus detector for detecting information for an object, comprising:
   a plurality of sensors provided in association with a plurality of different areas of an imaging surface;
   a plurality of processing circuits respectively provided in association with said plurality of sensors, to process signals output from said plurality of sensors; and
   a controller that supplies power to said plurality of sensors and said plurality of processing circuits, to actuate said plurality of sensors and said plurality of processing circuits,
   wherein said controller selectively supplies power only to predetermined sensors, and respective predetermined processing circuits associated with said predetermined sensors, on the basis of the focal length of an optical system that directs reflective light from an object to the imaging surface.

21. The focus detector according to claim 20, wherein the angle of view of the imaging surface changes with the focal length of the optical system, and said controller selectively supplies power only to sensors that correspond to an area existing in a position within the angle of view, and processing circuits associated with said sensors.

22. A focus detector for use with an auxiliary light, comprising:
- a plurality of sensors provided in association with a plurality of different areas;
- a plurality of processing circuits respectively provided in association with said plurality of sensors, to process signals output from said plurality of sensors; and
- a controller that supplies power to said plurality of sensors and said plurality of processing circuits, to actuate said plurality of the sensors and said plurality of processing circuits,
- wherein said controller selectively supplies power only to sensors that correspond to an area where an auxiliary light is ON to aid a focus information detection operation, and processing circuits associated with said sensors.

23. A camera comprising:

a camera body; and a focus detector comprising:
- a plurality of sensors provided in association with a plurality of different areas;
- a plurality of processing circuits respectively provided in association with said plurality of sensors, to process signals output from said plurality of sensors; and
- a controller that supplies power to said plurality of sensors and said plurality of processing circuits, to actuate said plurality of sensors and said plurality of processing circuits,
- wherein, to obtain focus information in a predetermined area from among the plurality of different areas, said controller selectively supplies power only to a sensor that corresponds to the predetermined area, and a processing circuit associated with said sensor.

24. A camera comprising:

a camera body; and a focus detector comprising:
- a plurality of sensors provided in association with a plurality of different areas;
- a plurality of processing circuits respectively provided in association with said plurality of sensors, to process signals output from said plurality of sensors;
- a power source that stores power for actuating said plurality of sensors and said plurality of processing circuits; and
- a controller that selectively supplies power from said power source to said plurality of sensors and said plurality of the processing circuits,
- wherein said controller selects a first group of sensors from said plurality of sensors, and a respective first group of processing circuits from said plurality of processing circuits associated with said first group of sensors, on the basis of a voltage value of the power source, and simultaneously supplies power to the selected first group of sensors and associated first group of processing circuits.

25. A camera comprising:

a camera body; and a focus detector for detecting focus information for an object, comprising:
- a plurality of sensors provided in association with a plurality of different areas of an imaging surface;
- a plurality of processing circuits respectively provided in association with said plurality of sensors, to process signals output from said plurality of sensors; and
- a controller that supplies power to said plurality of sensors and said plurality of processing circuits, to actuate said plurality of sensors and said plurality of processing circuits,
- wherein said controller selectively supplies power only to predetermined sensors, and respective predetermined processing circuits associated with said predetermined sensors, on the basis of the focal length of an optical system that directs reflective light from the object to the imaging surface.

26. A camera comprising:

a camera body; and a focus detector for use with an auxiliary light, comprising:
- a plurality of sensors provided in association with a plurality of different areas;
- a plurality of processing circuits respectively provided in association with said plurality of sensors, to process signals output from said plurality of sensors; and
- a controller that supplies power to said plurality of sensors and said plurality of processing circuits, to actuate said plurality of the sensors and said plurality of processing circuits,
- wherein said controller selectively supplies power only to sensors that correspond to an area where an auxiliary light is ON to aid a focus information detection operation, and processing circuits associated with said sensors.

* * * * *

UNITED STATES PATENT AND TRADEMARK OFFICE
CERTIFICATE OF CORRECTION

PATENT NO.     : 6,694,097 B2
DATED          : February 17, 2004
INVENTOR(S)    : Takanobu Tsunemiya et al.

It is certified that error appears in the above-identified patent and that said Letters Patent is hereby corrected as shown below:

Column 5,
Line 46, "less" should read -- less than --.

Column 6,
Line 26, "FIGS. 1A 1B," should read -- FIGS. 1A, 1B, --.

Column 8,
Line 22, "These" should read -- Those --.

Column 9,
Line 11, "senor" should read -- sensor --.

Column 12,
Line 13, "the" should be deleted.

Column 13,
Line 50, "the" should be deleted.

Column 14,
Line 42, "the" should be deleted.

Signed and Sealed this

Thirteenth Day of July, 2004

JON W. DUDAS
*Acting Director of the United States Patent and Trademark Office*